Jan. 2, 1923.
J. BARRY.
OUTLET BOX.
FILED OCT. 12, 1920.
1,441,054.
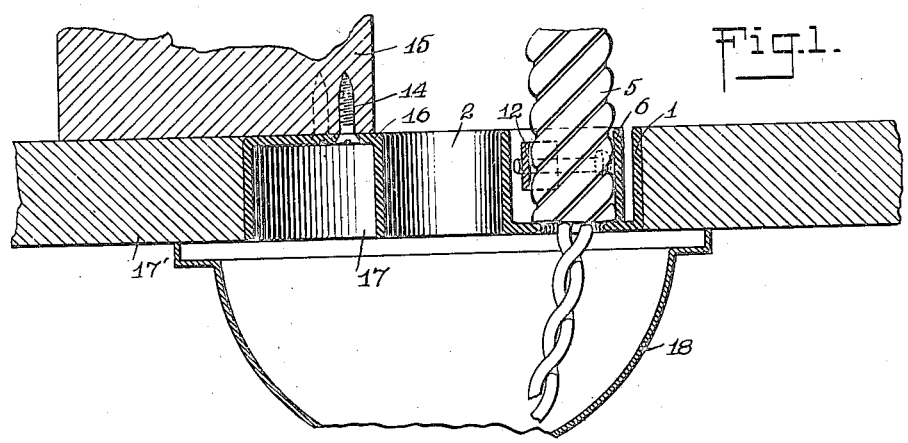
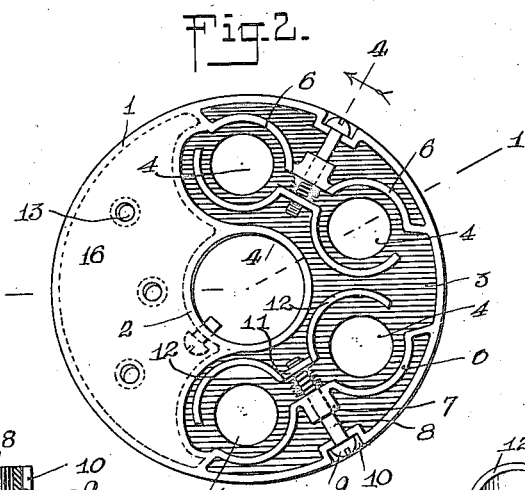
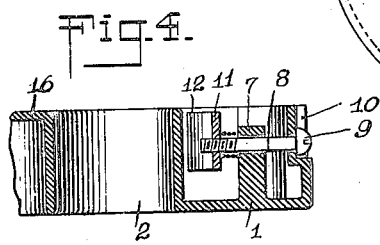
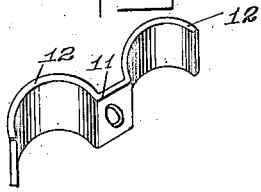
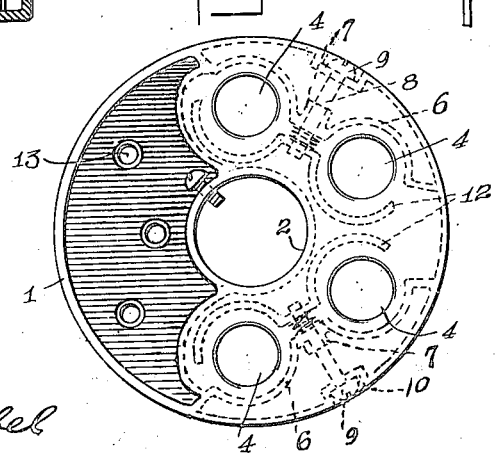
WITNESSES
William P. Giebel
Robert I. Hulsizer
INVENTOR
JOSEPH BARRY
BY
ATTORNEYS Patented Jan. 2, 1923.

1,441,054

UNITED STATES PATENT OFFICE.

JOSEPH BARRY, OF BROOKLYN, NEW YORK.

OUTLET BOX.

Application filed October 12, 1920. Serial No. 416,391.

*To all whom it may concern:*

Be it known that I, JOSEPH BARRY, a citizen of the United States, and a resident of the city of New York, borough of Brooklyn, in the county of Kings and State of New York, have invented a new and Improved Outlet Box, of which the following is a full, clear, and exact description.

This invention relates to electrical fixtures, and has particular reference to an outlet box.

An object of the invention resides in the provision of means whereby an outlet box adapted to receive a plurality of cables can be fastened to any stud or joist and yet permit the reception of cables therein with a minimum amount of distortion or disturbance thereof.

Another object resides in the provision of means whereby each cable is simply and efficiently clamped within the box without danger of tearing the insulation, which may result in short-circuiting the wires.

Another object is to provide a box which can receive a plurality of cables on a side wall, stud or ceiling without the aid of an auxiliary support, such as a gas pipe or a wooden backing.

A still further object resides in the provision of a clamping means for the cables in the outlet box whereby a simple, efficient grip is achieved without the usual side strains which tend to twist the insulation and covering and cause a short circuit.

Other objects will appear from a consideration of the following description and claims taken in connection with the accompanying drawings.

Hitherto in the use of outlet boxes, the apertures through which the cables are received are disposed uniformly around the surface of the box, so that if it is desired to fasten the box to a stud or joist it is impossible to do so without closing certain of the apertures or so disposing them that cables have to be twisted out of alignment in order to get them into the box. Moreover, in the present type of box the gripping means used is such as to cause a side strain on the cable insulation or covering which ultimately results in tearing the same, causing short circuit. My invention is directed to overcome these disadvantages and is achieved in the manner set forth in the following description and claims and shown in the accompanying drawings.

The invention is illustrated in the drawings, of which—

Figure 1 is a vertical section of the box as applied to a joist or stud in a ceiling;

Figure 2 is an inverted plan view of the box;

Figure 3 is a view of the box looking towards the ceiling, as shown in Figure 1;

Figure 4 is a partial section taken on the line 4—4 of Figure 2; and

Figure 5 is an enlarged detail of one of the clamping members.

As shown in the drawings, the invention is embodied in the form of an outlet box having a body portion 1, which is preferably circular in form. This body portion has a central aperture 2. This aperture is shown smooth but may be threaded to receive a suitable bushing or to receive the end of a gas pipe on which the outlet box may be mounted if desired. The outlet box on the rear face thereof is provided with a recess portion 3 in which portion a plurality of apertures 4 are disposed. These apertures 4 are adapted to receive the circuit wires or cables, such as 5. Adjacent each aperture 4 and formed integral with the body portion 1 are curved walls 6 the curvature of which simulates approximately the shape of the cable to be inserted in the box. These curved walls are connected together between pairs of apertures 4 by a bushing portion 7 having suitable apertures therein through which the body portion 8 of a screw is adapted to extend. The head 9 of the screw is seated in a suitable recess 10 in the outer face of the outlet box. Between each pair of apertures 4 is located the bushing portion 7 through which the screw 8 extends. The outer end of the screw 8 is adapted to extend through a threaded opening in an adjustable, movable clamping member 11. This clamping member, on opposite sides thereof, is formed into curved portions 12 simulating in curvature the stationary portion 6 above mentioned and spaced on opposite sides from the stationary portion 6 of the apertures 4. By the adjustment of the screw 8, the curved portions 12 are moved toward or away from the stationary curved portions 6. If a cable 5 is inserted into the recess portion 3, having previously been stripped along a portion of its end to free the circuit wires therein, these circuit wires extend through the apertures 4 and the main body portion of the cable abuts against the inner face of the recess portion 3 and is gripped between the stationary walls 6 and the movable walls 12. The inner faces of these walls are smooth and curved to approximate the curvature of the cable, so that a firm, even grip is achieved on the cable to hold it in position.

It will be noticed that a plurality of apertures 4 are disposed substantially on one side of the outlet box, the other side of the outlet box being uninterrupted excepting by a plurality of small screw-threaded holes 13 through which screws, such as 14, may extend to fasten the box to a stud or joist. By disposing the threaded apertures 13 on one side of the box, it can be fastened to a stud or joist, such as 15, in such manner as to cause the apertures 4 to lie on one side of the joist or stud 15. This permits the insertion of the cables in the outlet box without any disturbing of their alignment and twisting of the cables, which results in an increased expenditure of time and labor and the possibility of short-circuiting due to the strain on the cables. The edge 16 of the outlet box, through which the threaded holes 13 are pierced, is disposed along the rear edge of the outlet box and is hollow, as shown in figure 1 by the numeral 17, so as to make the outlet box as light as possible in weight. The body portion of this box may be cast in one piece and is, therefore, simple and economical to make.

In Figure 1 I have shown the outlet box applied to a stud or joist 15 in the ceiling, screws 14 extending through apertures 13 attached to the box and the joist along the edge 16, with the recess portion 3 of the box lying entirely on one side of the joist. Plaster 17' can be disposed against and around the lateral edges of the box to lie flush with its inner and outer edges, and another fixture or sealing portion 18 can be placed around the front face of the box in any suitable manner.

What I claim is:

1. An outlet box which comprises a circular ringlike body portion, a wall extending partly across the front face of the ring, and a rear wall extending partly across the rear face of the ring to cover that portion of the rear face not covered by the front wall, one of said walls having a plurality of cable-receiving apertures disposed therein, the other of said walls having a plurality of apertures to receive screws or fastening means, each of said walls being flush with respect to the edges of the body portion.

2. An outlet box which comprises a body portion having a flat wall and a recess on each face, the wall on one face being flush with the respective edge of the body portion and disposed opposite the recess on the other face, one of said walls having a plurality of cable-receiving apertures therein, the other of said walls on the opposite face of the box having apertures therein to receive fastening means.

JOSEPH BARRY.